(12) United States Patent
Aoki et al.

(10) Patent No.: US 7,397,626 B2
(45) Date of Patent: Jul. 8, 2008

(54) STORAGE DEVICE, CONTINUOUS-VIBRATION DETECTING METHOD, AND CONTROL APPARATUS

(75) Inventors: Takahiro Aoki, Kawasaki (JP); Takeshi Hara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/546,082

(22) Filed: Oct. 11, 2006

(65) Prior Publication Data

US 2007/0291392 A1 Dec. 20, 2007

(30) Foreign Application Priority Data

Jun. 14, 2006 (JP) ............................. 2006-165233

(51) Int. Cl.
*G11B 5/54* (2006.01)
*G11B 21/12* (2006.01)

(52) U.S. Cl. ...................................... 360/75
(58) Field of Classification Search .................. None
See application file for complete search history.

(56) References Cited

U.S. PATENT DOCUMENTS

| | | | |
|---|---|---|---|
| 5,982,573 A * | 11/1999 | Henze | 360/75 |
| 6,771,449 B1 | 8/2004 | Ito et al. | |
| 6,995,939 B2 | 2/2006 | Ito et al. | |
| 7,190,540 B2 * | 3/2007 | Matsumoto | 360/75 |
| 7,191,089 B2 * | 3/2007 | Clifford et al. | 702/141 |
| 2005/0270700 A1 | 12/2005 | Matsumoto | |
| 2007/0121239 A1 * | 5/2007 | Ando | 360/75 |

FOREIGN PATENT DOCUMENTS

| | | |
|---|---|---|
| JP | 2002-8336 | 1/2002 |
| JP | 2002-174641 | 6/2002 |
| JP | 2003-263240 | 9/2003 |
| JP | 2003346444 A * | 12/2003 |
| JP | 2004-355775 | 12/2004 |
| JP | 2005-302557 | 10/2005 |
| JP | 2005-346840 | 12/2005 |

* cited by examiner

*Primary Examiner*—Hoa Nguyen
*Assistant Examiner*—James L Habermehl
(74) *Attorney, Agent, or Firm*—Greer, Burns & Crain, Ltd.

(57) ABSTRACT

A falling-time measuring unit acquires information indicating whether a magnetic disk drive is falling, from a fall sensor at a predetermined sampling cycle, and measures a falling time based on the acquired information. A threshold changing unit counts number of times the measured falling time exceeds a predetermined fall-determination threshold within a predetermined time, and extends the fall-determination threshold when the counted number of times exceeds a predetermined maximum number of times. A head retracting unit retracts the head to the retraction position when the measured falling time exceeds the extended fall-determination threshold.

20 Claims, 6 Drawing Sheets

FIG.3

| FIRST SLICE DETECTING TIME (ms) | 200b DETERMINATION-TIME DATA SECOND SLICE DETECTING TIME (ms) |
|---|---|
| x x x | x x x | ary storage device of a general-purpose computer and # STORAGE DEVICE, CONTINUOUS-VIBRATION DETECTING METHOD, AND CONTROL APPARATUS

BACKGROUND OF THE INVENTION

1. Field of the Invention

The present invention relates to a technology for retracting a head on a storage medium by detecting a fall of a storage device, with a capability of preventing a degradation of performance when a continuous vibration is erroneously detected as the fall.

2. Description of the Related Art

A magnetic disk drive (storage device) is mainly used as an auxiliary storage device of a general-purpose computer and for a business-purpose device that requires high-capacity random access data recording. Furthermore, use of the magnetic disk drive as a general household appliance has increased recently, with an advance of digitalization of household appliances and an increase of applications to record data such as audio-visual data as digital data (for example, a hard disk video recorder and a portable music reproducing device).

However, when the magnetic disk drive receives a strong impact due to a fall, a head collides with a disk surface and the disk surface gets scratched, and data reading and writing may become impossible. Particularly, falls of the magnetic disk drive while it is in operation cause the magnetic disk drive to become easily out of order. Therefore, when handling a product that includes a magnetic disk drive for a portable application, an attention had to be paid to avoid giving a strong impact to the product.

Japanese Patent Application Laid-Open No. 2002-8336 discloses a technology that uses a fall sensor to prevent damages caused by falls of the magnetic disk drive and retracts the head from the disk surface when a free fall of the magnetic disk drive is detected.

However, the convention technology described above had a problem of degrading performance of the magnetic disk drive since the conventional art simply forcibly retracts the head from the disk surface when erroneously detecting falls of the magnetic disk drive.

Because, in some cases of the conventional method, the fall sensor erroneously detects falls while carrying the magnetic disk drive and during normal use when the magnetic disk drive is not actually falling, and each time the head was retracted from the disk surface.

For example, when the magnetic disk drive is mounted on a personal computer and the personal computer is lifted during transport or used on the lap, a slow cycle vibration is presumably continuously transmitted to the magnetic disk drive. In this case, due to characteristics of the fall sensor, the fall sensor often times erroneously detects the slow cycle vibration as a fall of a certain time. Accesses to the disk for data recording and reproducing are delayed when the head is retracted out from the disk surface each time the fall sensor detects erroneously, and as a result, capability of the personal computer may decrease.

SUMMARY OF THE INVENTION

It is an object of the present invention to at least partially solve the problems in the conventional technology.

A storage device according to one aspect of the present invention retracts a head on a storage medium to a predetermined retraction position upon detecting a fall. The storage device includes a falling-time measuring unit that acquires information indicating whether the magnetic disk drive is falling, from a fall sensor at a predetermined sampling cycle, and measures a falling time based on the acquired information; a threshold changing unit that counts number of times the measured falling time exceeds a predetermined fall-determination threshold within a predetermined time, and extends the fall-determination threshold when the counted number of times exceeds a predetermined maximum number of times; and a head retracting unit that retracts the head to the retraction position when the measured falling time exceeds the extended fall-determination threshold.

A continuous-vibration detecting method according to another aspect of the present invention is for a storage device that retracts a head on a storage medium to a predetermined retraction position upon detecting a fall. The continuous-vibration detecting method includes falling-time measuring including acquiring information indicating whether the magnetic disk drive is falling, from a fall sensor at a predetermined sampling cycle, and measuring a falling time based on the acquired information; threshold changing including counting number of times the measured falling time exceeds a predetermined fall-determination threshold within a predetermined time, and extending the fall-determination threshold when the counted number of times exceeds a predetermined maximum number of times; and retracting the head to the retraction position when the measured falling time exceeds the extended fall-determination threshold.

A computer program product according to still anther aspect of the present invention includes a computer usable medium having computer readable program codes embodied in the medium that when executed causes a computer to execute falling-time measuring including acquiring information indicating whether the magnetic disk drive is falling, from a fall sensor at a predetermined sampling cycle, and measuring a falling time based on the acquired information; threshold changing including counting number of times the measured falling time exceeds a predetermined fall-determination threshold within a predetermined time, and extending the fall-determination threshold when the counted number of times exceeds a predetermined maximum number of times; and retracting the head to the retraction position when the measured falling time exceeds the extended fall-determination threshold.

A control apparatus according to still anther aspect of the present invention controls a storage device that retracts a head on a storage medium to a predetermined retraction position upon detecting a fall. The control apparatus includes a falling-time measuring unit that acquires information indicating whether the magnetic disk drive is falling, from a fall sensor at a predetermined sampling cycle, and measures a falling time based on the acquired information; a threshold changing unit that counts number of times the measured falling time exceeds a predetermined fall-determination threshold within a predetermined time, and extends the fall-determination threshold when the counted number of times exceeds a predetermined maximum number of times; and a head retracting unit that retracts the head to the retraction position when the measured falling time exceeds the extended fall-determination threshold.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an example of determination-time data;

DETAILED DESCRIPTION OF THE PREFERRED EMBODIMENTS

Exemplary embodiments of the present invention will be explained in detail below with reference to the accompanying drawings. The following description will be made of cases of the present invention applied to a magnetic disk drive.

A concept of a magnetic disk drive 100 according to the present embodiment will be described. The magnetic disk drive 100 provides a fall sensor that detects free falls in all three axis (X-Y-Z) directions. The fall sensor is a sensor that sends out a fall detecting signal indicative of whether the fall sensor itself is falling based on an analog waveform outputted from an acceleration sensor of three axis directions.

The magnetic disk drive 100 periodically acquires a fall detecting signal sent out by the fall sensor at a predetermined sampling cycle and measures a falling time. When the measured falling time exceeds a first threshold, the magnetic disk drive 100 retracts a head to a fixed cylinder on a magnetic disk surface, and when the measured falling time exceeds the second threshold, the magnetic disk drive 100 retracts the head to a ramp. As a result, the event that the magnetic disk is damaged can be prevented. The first threshold and the second threshold are hereinafter referred to as a "first slice detecting time" and a "second slice detecting time" respectively.

Figure 1:
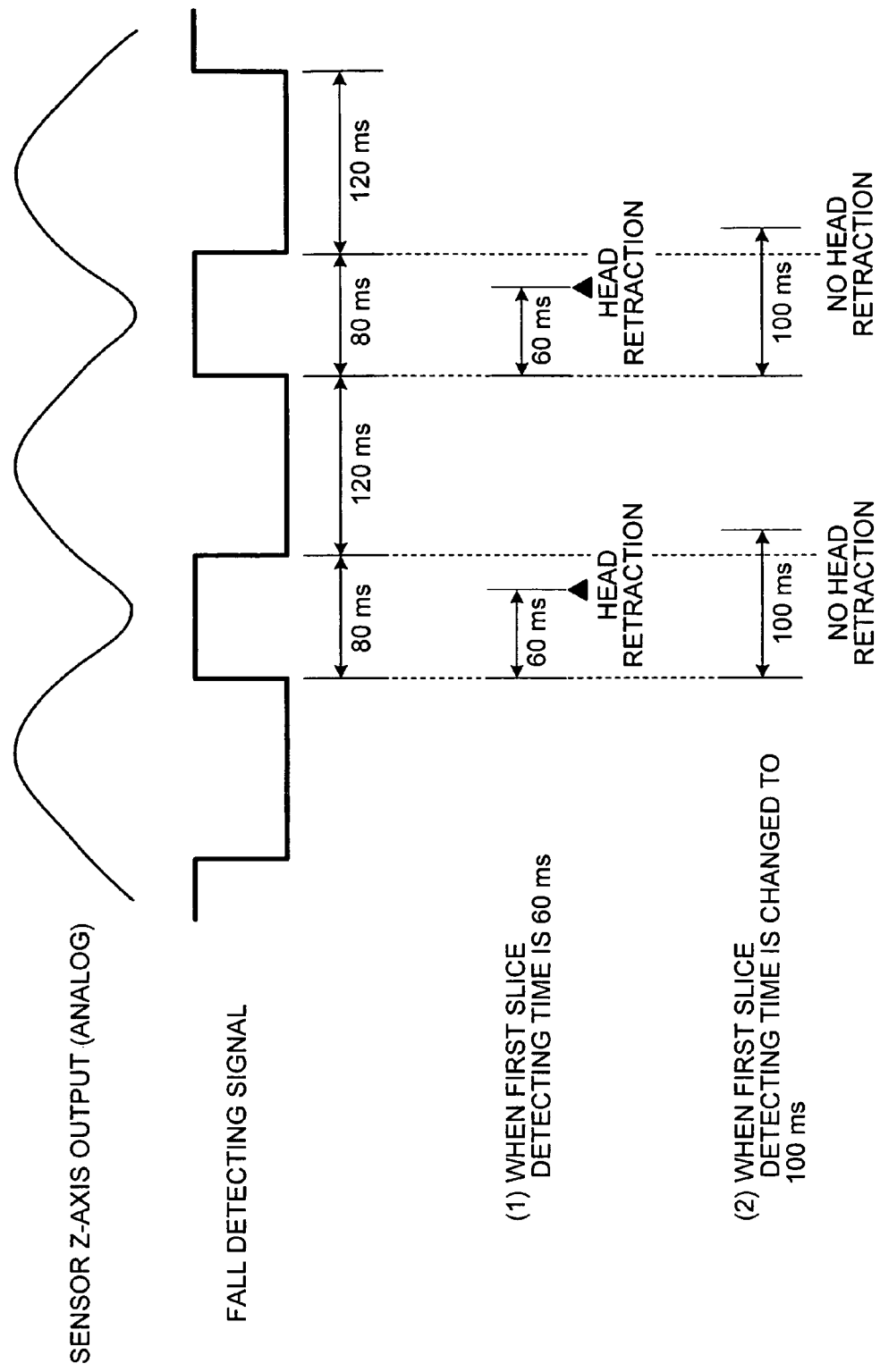
FIG. 1 is a schematic diagram for explaining a concept of a magnetic disk drive according to an embodiment of the present invention.

FIG. 1 is an explanatory view that explains the concept of the magnetic disk drive 100. For example, assume that slow cycle vibrations are continuously transmitted to the magnetic disk drive 100 as shown in FIG. 1 and a falling time of 80 ms is measured at 120 ms intervals based on the fall detecting signal from the fall sensor.

Assume the first slice detecting time is 60 ms. In this case, the head is retracted to the fixed cylinder each time a falling time of 80 ms is measured (see (1) of FIG. 1). However, the magnetic disk drive 100 is only shaking with a slow cycle vibration and is not falling; therefore, the head does not require to be retracted to the fixed cylinder.

In consideration of this situation, the magnetic disk drive 100 counts a number of times the falling time exceeds the first slice detecting time, and when the number of times counted within a predetermined measurement time exceeds a predetermined maximum number of times, the magnetic disk drive 100 extends the first slice detecting time until surpassing a periodic falling time. As a result, when the magnetic disk drive 100 receives a continuous vibration, the magnetic disk drive 100 does not erroneously detect the vibration as a fall and can control the head not to be retracted to the fixed cylinder. The predetermined measurement time is hereinafter referred to as a "threshold changing reference time".

For example, assume that the magnetic disk drive 100 extends the slice detecting time from 60 ms to 100 ms. Even if the vibration of FIG. 1 is transmitted to the magnetic disk drive 100, the head is not retracted to the fixed cylinder since the slice detecting time surpasses the falling time (see (2) of FIG. 1).

In this way, the magnetic disk drive 100 according to the present embodiment can prevent performance degradation of the disk drive resulted from frequent head retractions since the magnetic disk drive 100 acquires, from the fall sensor at a predetermined sampling cycle, the fall detecting signal indicative of whether the magnetic disk drive 100 is falling and measures the falling time of the magnetic disk drive 100. The magnetic disk drive 100 then counts a number of times the measured falling time exceeds the first slice detecting time within the predetermined threshold changing reference time and extends the first slice detecting time when the number of times exceeds the predetermined maximum number of times and retracts the head to a retraction position when the falling time exceeds the first slice detecting time, and therefore the magnetic disk drive 100 can control the head not to be retracted to the fixed cylinder when the continuous vibration is erroneously detected as a fall.

Since the present invention can prevent performance degradation that occurs when the continuous vibration is erroneously detected as a fall, when the magnetic disk drive 100 are used for devices such as a computer and a home appliance, a user can use the devices at ease without worrying about vibrations or shakes, and utility value of the devices can be increased.

Figure 2:
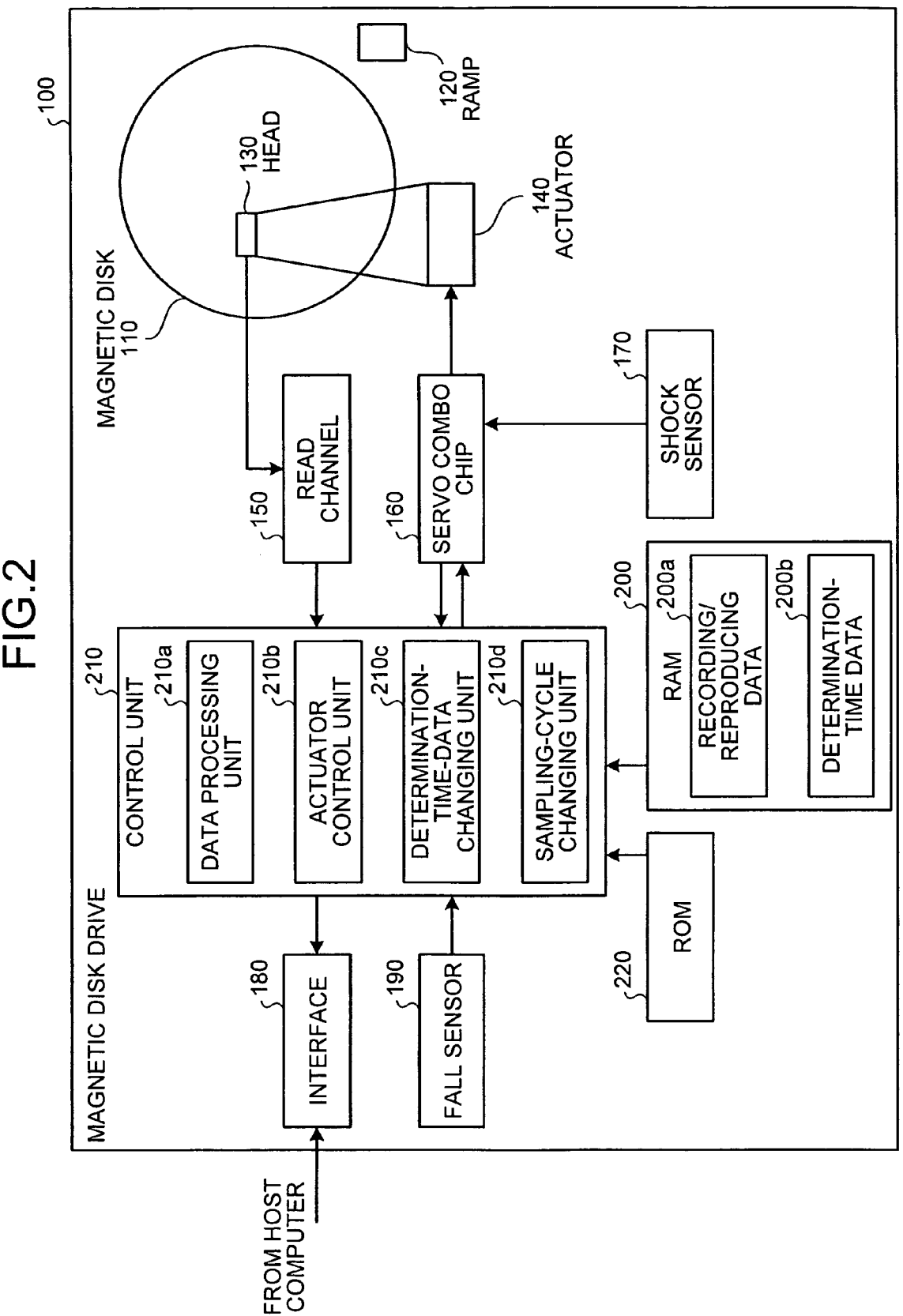
FIG. 2 is a functional block diagram of a configuration of the magnetic disk drive according to the present embodiment.

A configuration of the magnetic disk drive 100 according to the present embodiment will then be explained. FIG. 2 is a functional block diagram of a configuration of the magnetic disk drive 100. As shown in FIG. 2, the magnetic disk drive 100 is configured to include a magnetic disk 110, a ramp 120, a head 130, an actuator 140, a read channel 150, a servo combo chip 160, a shock sensor 170, an interface 180, a fall sensor 190, a random access memory (RAM) 200, a control unit 210, and a read only memory (ROM) 220. Other configurations are similar to the configurations of a general magnetic disk drive with a Load/Unload method, and will not be explained.

The magnetic disk 110 is a recording medium forming a magnetic film on a metal or glass disk-shaped substrate. To record data on the magnetic disk 110, a magnetic field is radiated from the head 130 to a recording area that records data of the magnetic disk 110, and the magnetization state of the magnetic film of the magnetic disk 110 is changed. To reproduce the data from the magnetic disk 110, the head 130 is moved to a recording area on the magnetic disk 110 to be reproduced and the magnetization state of the magnetic film of the magnetic disk 110 is read.

The magnetic disk 110 is provided with a fixed cylinder (or unload cylinder). When the magnetic disk drive 100 retracts the head 130 to the ramp 120, the magnetic disk drive 100 first moves the head 130 to the fixed cylinder provided at the magnetic disk drive 100, and then retracts the head 130 to the ramp 120. The distance between the position of the fixed cylinder provided at the magnetic disk drive 100 and the position of the ramp 120 is maintained constant. The ramp 120 is a part that stops the head 130 during retractions.

The head 130 is a device that records and reproduces data to and from the magnetic disk 110. The head 130 reads a servo signal that controls a track position, etc, from the magnetic disk 110 and outputs to the read channel 150 the servo signal with reproduction data reproduced from the magnetic disk 110.

The actuator 140 is a device that includes a voice coil motor (VCM) and that moves the head 130 with a control current outputted from the servo combo chip 160. The read channel 150 is a device that acquires reproduction data and the servo signal from the head 130, and outputs the acquired reproduction data and servo signal to the control unit 210.

The servo combo chip 160 is a device that outputs the control current to the actuator 140 following instructions from the control unit 210 and that controls the movement of the head 130. The servo combo chip 160 also outputs the control current to a spindle motor not shown and that controls the rotation of the magnetic disk 110.

The shock sensor 170 is a sensor that detects shocks given to the magnetic disk drive 100. The shock sensor 170 outputs information of the detected shocks to the control unit 210 through the servo combo chip 160.

The interface 180 is a device that controls communication with a host computer not shown in the drawings. The fall sensor 190 is a sensor that detects free falls of the magnetic disk drive 100 in all three-axis (X-Y-Z) directions, and outputs a fall signal indicating whether the magnetic disk drive 100 is falling to the control unit 210.

The RAM 200 is a device that stores data necessary for various processes by the control unit 210, and the RAM 200 deeply related to the present invention stores recording/reproducing data 200a and determination-time data 200b.

The recording/reproducing data 200a is data acquired from the host computer that is to be recorded on the magnetic disk 110 or data reproduced from the magnetic disk 110. The magnetic disk drive 100 first stores the data to be recorded on the magnetic disk 110 and the data to be reproduced from the magnetic disk 110 to the RAM 200.

The determination-time data 200b includes the first slice detecting time that determines whether to move the head 130 to the fixed cylinder and the second slice detecting time that determines whether to move the head 130 from the fixed cylinder to the ramp 120. The first slice detecting time and the second slice detecting time have a relationship of the first slice detecting time<the second slice detecting time.

The first slice detecting time and the second slice detecting time as thresholds, the magnetic disk drive 100 moves the head 130 to the fixed cylinder on the disk surface when the falling time exceeds the first slice detecting time and retracts the head 130 on the fixed cylinder to the ramp 120 when the falling time exceeds the second slice detecting time.

FIG. 3 is a view of one example of the determination-time data 200b. For example, 202 ms is set for the first slice detecting time and 247 ms is set for the second slice detecting time. The determination-time data 200b that includes the first slice detecting time and second slice detecting time may be stored in the RAM 200 in advance or may store a time that a user inputted from an input device (a keyboard, etc.) not shown.

Returning to FIG. 1, the control unit 210 is a device that conducts various processes using programs or control data that provide various procedures and that are stored in the ROM 220. Particularly, the control unit 210 deeply related to the present invention provides a data processing unit 210a, an actuator control unit 210b, a determination-time-data changing unit 210c, and a sampling-cycle changing unit 210d.

Among these units, the data processing unit 210a is a control unit that records data acquired from the host computer to the recording/reproducing data 200a and that acquires data (data reproduced from the magnetic disk 110, etc.) from the recording/reproducing data in compliance with a request from the host computer, and the data processing unit 210a then outputs the data to the host computer.

The actuator control unit 210b is a control unit that outputs a control command to the servo combo chip 160 and that moves the head 130 to a predetermined position. Specifically, the actuator control unit 210b acquires the fall detecting signal, from the fall sensor 190 at a predetermined sampling cycle, indicative of whether the magnetic disk drive 100 is falling and measures the falling time of the magnetic disk drive 100 based on the acquired fall detecting signal.

The actuator control unit 210b then moves the head 130 to the fixed cylinder when the measured falling time exceeds the first slice detecting time (see FIG. 3) included in the determination-time data 200b. The actuator control unit 210b moves the head 130 to the ramp 120 when the falling time of the magnetic disk drive 100 exceeds the second slice detecting time (see FIG. 3) included in the determination-time data 200b.

The actuator control unit 210b also moves the head 130 to a predetermined area of the magnetic disk 110 when data recording or reproducing to and from the magnetic disk drive 100 is conducted.

The determination-time-data changing unit 210c is a processing unit that changes the first slice detecting time based on a number of times the falling time exceeds the first slice detecting time. Specifically, the determination-time-data changing unit 210c monitors the falling time measured by the actuator control unit 210b and counts a number of times the falling time exceeds the first slice detecting time (hereinafter, "number of first slice detections") within a predetermined threshold changing reference time. The determination-time-data changing unit 210c then adds an extended time to the first slice detecting time included in the determination-time data 200b when the counted number of times exceeds a predetermined maximum number of times and subtracts a predetermined reduced time from the first slice detecting time included in the determination-time data 200b when the counted number of times does not exceed the predetermined maximum number of times.

If a continuous vibration is transmitted to the magnetic disk drive 100 as a result of the determination-time-data changing unit 210c extending the first slice detecting time for the predetermined extended time when the number of times the falling time exceeds the first slice detecting time exceeds the predetermined maximum number of times within the threshold changing reference time, the first slice detecting time can be set to surpass the falling time measured with the vibration, causing the head to not to be retracted to the fixed cylinder.

On the other hand, with the determination-time-data changing unit 210c reducing the first slice detecting time for a predetermined changing time when the number of times the falling time exceeds the first detecting time does not exceed the predetermined number of times, the first slice detecting time can be changed again in accordance with a vibration with small amplitude even when the first slice detecting time is extended by a vibration with large amplitude, for example. In other words, the determination-time-data changing unit 210c learns vibrations transmitted to the magnetic disk drive 100, and for each vibration, setting of the first slice detecting time with a minimum length that surpasses the measured falling time can be possible. As a result, the timing of the head retracted to the fixed cylinder can be maintained optimal.

A maximum value of the first slice detecting time can be set in advance, and when extending the first slice detecting time, the slice detecting time can be limited so as not to surpass the maximum value. In the same way, a minimum value of the first slice detecting time can be set, and when extending the first slice detecting time, the slice detecting time can be limited so as not to be less than the minimum value. In this way, a condition of the head retraction becoming extremely strict or extremely lenient can be prevented, and safety against falls within a certain scope can be ensured.

The sampling-cycle changing unit 210d is a control unit that changes the sampling cycle based on the falling time. Specifically, the sampling-cycle changing unit 210d monitors the falling time measured by the actuator control unit 210b, and when the falling time exceeds a predetermined sampling changing threshold, the sampling-cycle changing unit 210d controls the actuator control unit 210b and reduces the sampling cycle for a predetermined length, and when the falling time does not exceed the sampling-cycle changing threshold, the sampling-cycle changing unit 210d controls the actuator control unit 210b and extends the sampling cycle for a predetermined length. The sampling-cycle changing threshold is hereinafter referred to as a "sampling-cycle changing time".

By the sampling-cycle changing unit 210d reducing the sampling cycle when the falling time exceeds a predetermined sampling-cycle changing time, accuracy of sampling improves, and for example, whether the magnetic disk drive 100 is actually falling can be checked even if the vibration cycle and the sampling cycle coincidentally correspond.

On the other hand, by the sampling-cycle changing unit 210d extending the sampling cycle when the falling time does not exceed the predetermined sampling-cycle changing time, the load relating to the fall detection can be reduced, for example, when the magnetic disk drive 100 is put on a stable place and used. Therefore, reduction in power consumption of the magnetic disk drive can be achieved.

By precisely setting the sampling cycle when the detecting accuracy of falls is required and by roughly setting the sampling cycle when the detecting accuracy is not required, the load of the process conducted by the control unit 210 can be reduced and reduction in power consumption can be achieved.

Figure 4:
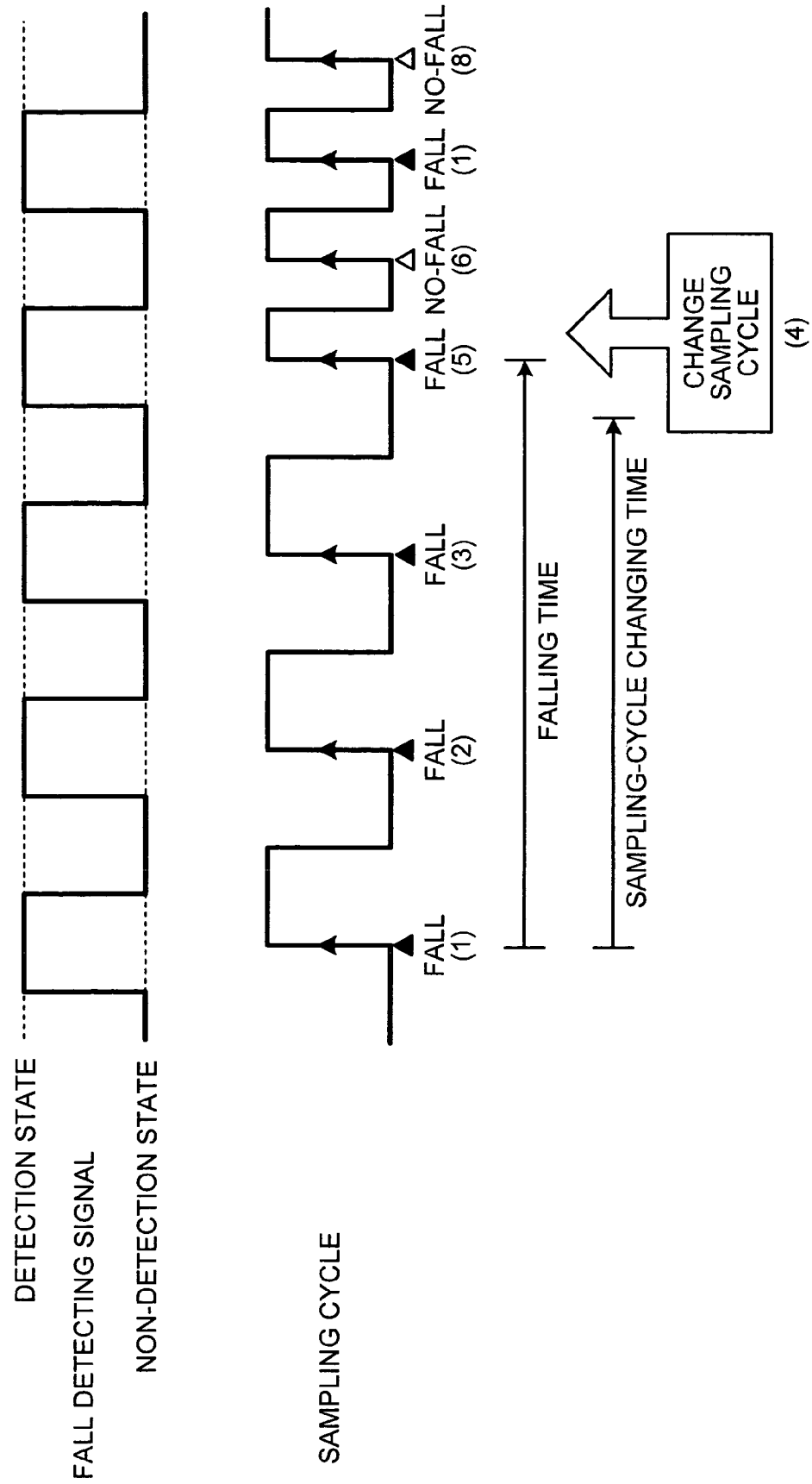
FIG. 4 is a schematic diagram for explaining a sampling-cycle changing process by a sampling-cycle changing unit.

FIG. 4 is an explanatory view that explains a sampling-cycle changing process conducted by the sampling-cycle changing unit 210d. For example, when the vibration cycle transmitted to the magnetic disk drive 100 and the sampling cycle correspond, the actuator control unit 210b continuously acquires fall detection signals indicative of falls, as shown in FIG. 4 (see (1) to (3) of FIG. 4). However, the magnetic disk drive 100 is not actually falling but only periodically shaking with vibrations.

When the falling time that the actuator control unit 210b measures exceeds the sampling-cycle changing time, the sampling-cycle changing unit 210d controls the actuator control unit 210b and reduces the sampling cycle for a predetermined length (see (4) of FIG. 4). Consequently, as shown in FIG. 4, the fact that the magnetic disk drive 100 is not actually falling can be confirmed since fall detecting signals indicative of not-falling that have not been detected come to be detected (see (6) and (8) of FIG. 4).

Although the case using a single sampling-cycle changing time is described here, a plurality of sampling-cycle changing times having different lengths can be set in phases, and a predetermined sampling cycle can be set for each sampling-cycle changing time. In this way, for example, when a falling time is continuously measured for a long time, sampling cycles can be set minutely in phases, and accuracy of sampling can be adjusted in compliance with detecting status of falls.

Although, the case that accuracy of sampling is improved by reducing the sampling cycle is also described here, whether the magnetic disk drive 100 is actually falling may be able to be checked by moving the sampling timing only for a predetermined interval. For example, even when the vibration cycle and the sampling cycle coincidentally correspond, a fall detecting signal indicative of not-falling is detected by moving the sampling timing. As a result, the fact that the magnetic disk drive 100 is not falling can be checked.

Figure 5:
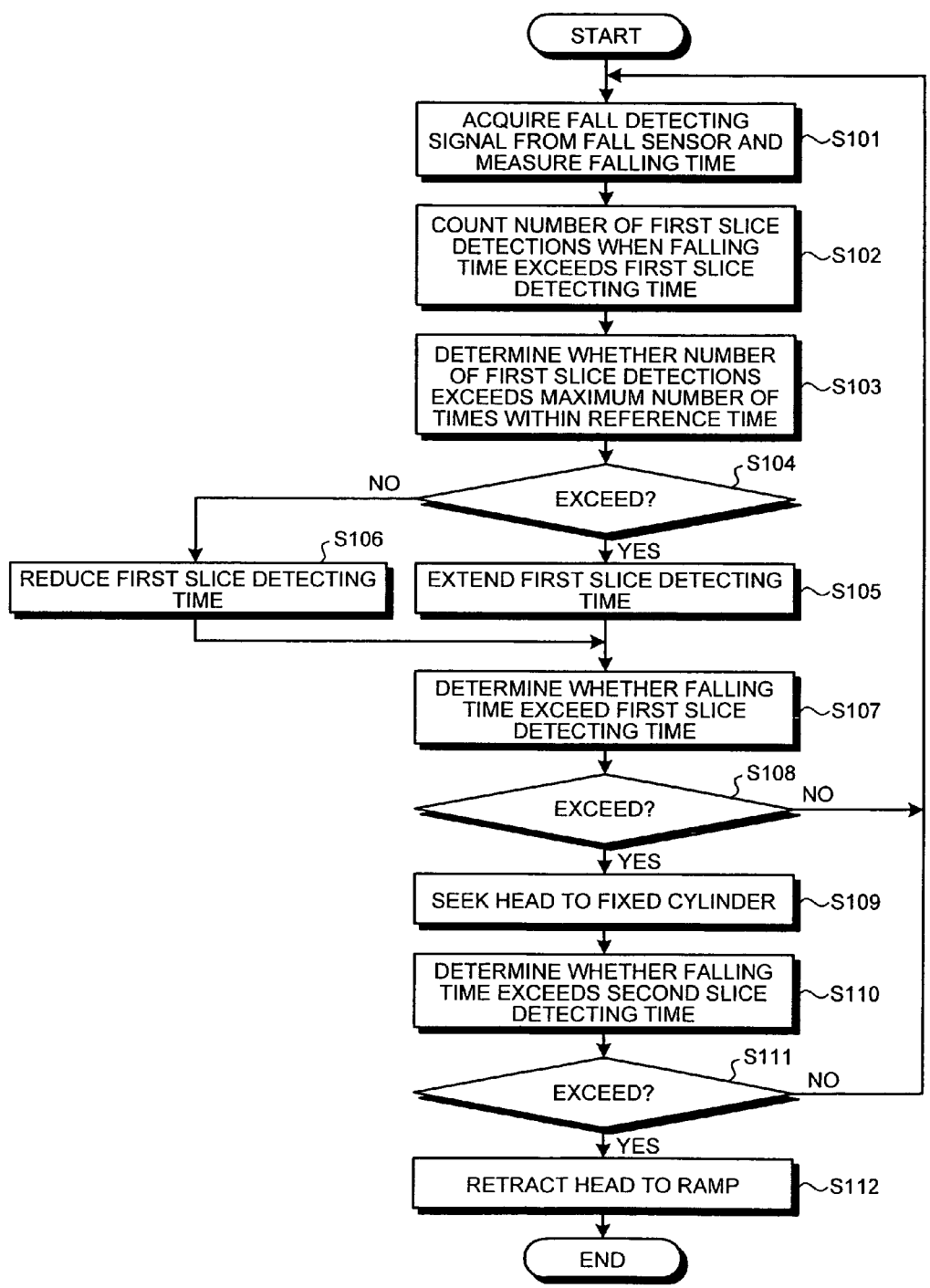
FIG. 5 is a flowchart of a processing procedure for a head retraction process by the magnetic disk drive according to the present embodiment.

A procedure of the head retraction process by the magnetic disk drive 100 according to the present embodiment will then be described. FIG. 5 is a flowchart of the procedure of the head retraction process by the magnetic disk drive 100 according to the present embodiment. As shown in FIG. 5, in the magnetic disk drive 100, the actuator control unit 210b acquires a fall detecting signal from the fall sensor and measures the falling time (step S101).

The determination-time-data changing unit 210c counts a number of times (a number of first slice detections) the falling time exceeds the first slice detecting time (step S102), and determines whether the counted number of times exceeds the predetermined maximum number of times (step S103). When the counted number of times exceeds the maximum number of times within the threshold changing reference time (step S104, Yes), the determination-time-data changing unit 210c extends the slice detecting time for a predetermined extended time (step S105), and when the counted number of times does not exceed the maximum number of times (step S104, No), the determination-time-data changing unit 210c reduces the first slice detecting time for a predetermined reduced time (step S106).

The actuator control unit 210b determines whether the falling time exceeds the first slice detecting time (step S107), and when the falling time exceeds the first slice detecting time (step S108, Yes), the actuator control unit 210b seeks the head to the fixed cylinder (step S109). When the falling time does not exceed the first slice detecting time (step S108, No), the actuator control unit 210b moves the control to step S101.

The actuator control unit 210b further determines whether the falling time exceeds the second slice detecting time (step S110), and when the falling time exceeds the second slice detecting time (step S111, Yes), the actuator control unit 210b retracts the head to the ramp (step S112). When the falling time does not exceed the second slice detecting time (step S111, No), the actuator control unit 210b moves the control to step S101.

The actuator control unit 210b measures the falling time, and the determination-time-data changing unit 210c counts the number of times the falling time exceeds the first slice detecting time within the predetermined threshold changing reference time and determines whether the counted number of times exceeds the predetermined maximum number of times. The determination-time-data changing unit 210c extends the first slice detecting time when the counted number of times exceeds the predetermined maximum number of times and reduces the first slice detecting time when the counted number of times exceeds the predetermined maximum number of times. In this way, when the continuous vibration is transmitted to the magnetic disk drive 100, the first slice detecting time can be set to surpass the falling time detected by the vibration, and the head can be controlled not to be retracted to the fixed cylinder. Therefore, performance degradation of the magnetic disk drive due to frequent head retractions can be prevented.

Figure 6:
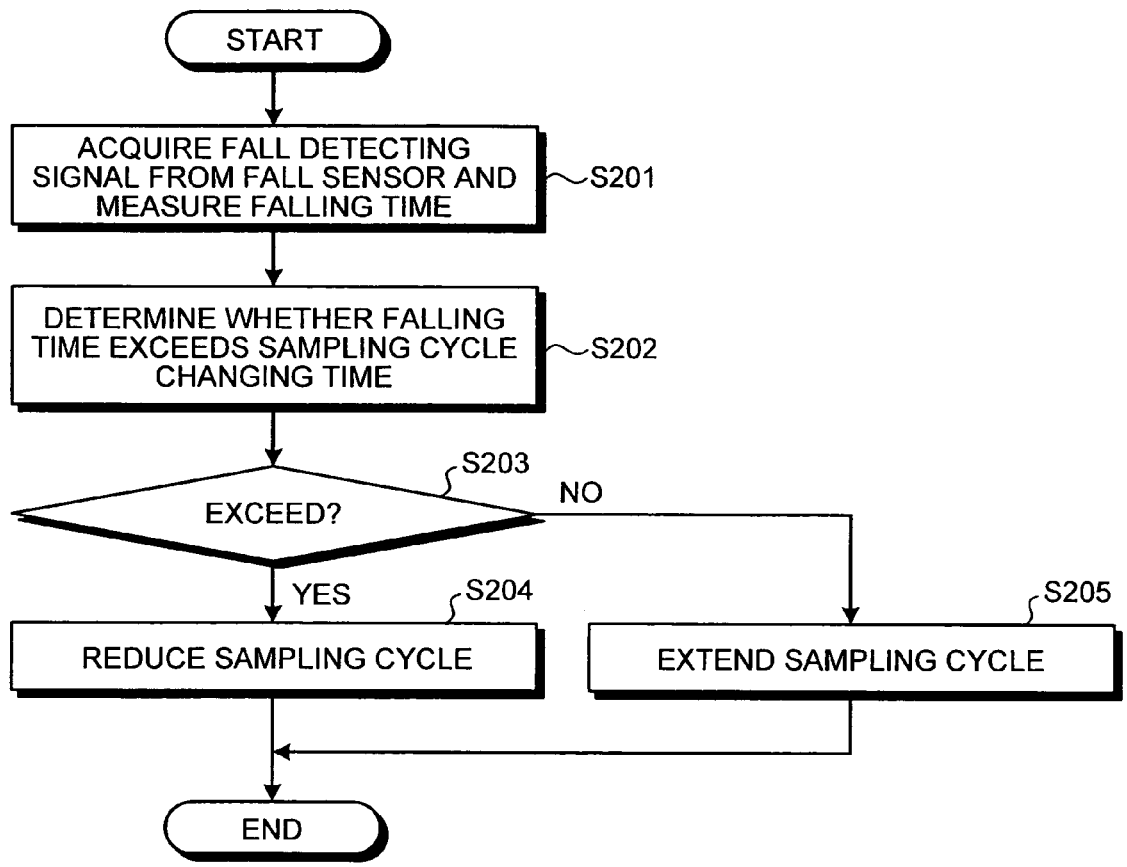
FIG. 6 is a flowchart of a processing procedure for the sampling-cycle changing process by the sampling-cycle changing unit.

A procedure of the sampling-cycle changing process by the sampling-cycle changing unit 210d will then be described. FIG. 6 is a flowchart of the procedure of the sampling-cycle changing process by the sampling-cycle changing unit 210d. As shown in FIG. 6, when the actuator control unit 210b acquires a fall detecting signal from the fall sensor and measures a falling time (step S201), the sampling-cycle changing unit 210*d* determines whether the falling time exceeds the sampling-cycle changing time (step S202).

When the falling time exceeds the sampling-cycle changing time (step S203, Yes), the sampling-cycle changing unit 210*d* reduces the sampling cycle for a predetermined length (step S204). When the falling time does not exceed the sampling-cycle changing time (step S203, No), the sampling-cycle changing unit 210*d* extends the sampling cycle for a predetermined length (step S205).

By the sampling-cycle changing unit 210*d* changing the sampling cycle based on the falling time, the sampling cycle is minutely set when accuracy of the fall detection is required and roughly set when accuracy of the fall detection is not required. In this way, accuracy of the process relating to the fall detection can be automatically adjusted as necessary.

Both of the head retraction process and the sampling-cycle changing process described above are conducted based on the falling time, and either of the two can be conducted first.

As described above, in the embodiments, the actuator control unit 210*b* acquires, from the fall sensor at the predetermined cycle, the fall detecting signal indicative of whether the magnetic disk drive is falling and measures the falling time of the magnetic disk drive, and the determination-time-data changing unit 210*c* counts the number of times the falling time exceeds the first slice detecting time within the predetermined threshold changing reference time and extends the first slice detecting time when the number of times exceeds the predetermined maximum number of times. Since the actuator control unit 210*b* retracts the head to the retraction position when the falling time exceeds the first slice detecting time, control of the head not to be retracted to the fixed cylinder can be possible when the continuous vibration is erroneously detected as a fall, and performance degradation of the magnetic disk drive due to the frequent head retractions can be prevented.

In the embodiments, since the determination-time-data changing unit 210*c* counts the number of times the falling time exceeds the first slice detecting time within the measurement time and reduces the first slice detecting time when the number of times does not exceed the maximum number of times, the first slice detecting time can be changed again in accordance with the vibration with small amplitude even when the first slice detecting time is extended by the vibration with large amplitude, for example. In other words, the determination-time-data changing unit 210*c* learns the continuous vibrations transmitted to the magnetic disk drive 100, and for each vibration, setting of the first slice detecting time with a minimum length that surpasses the measured falling time can be possible. As a result, the timing of the head retracted to the fixed cylinder can be maintained optimal.

The various processes described in the embodiments above can be realized by executing prepared programs with a central processing unit (CPU) or with processing devices such as a micro control unit (MCU), a micro processing unit (MPU), etc., provided by the magnetic disk drive 100. In the example of FIG. 2, various programs realizing the various processes are stored in the ROM 220, and various processes realizing functions of the various processing units (the data processing unit 210*a*, the actuator control unit 210*b*, the determination-time-data changing unit 210*c*, and the sampling-cycle changing unit 210*d*) are activated with the control unit 210 reading and executing the various programs recorded in the ROM 220.

The various programs are not necessarily to be stored in the ROM from the beginning. For example, the various programs can be stored in "portable physical media" such as a flexible disk (FD), a CD-ROM, a digital versatile disk (DVD), a magneto-optical disk, and an IC card that are inserted to computers, or in "fixed physical media" such as a hard disk drive (HDD) provided inside and outside of computers, and the computers can read the various programs from the media and execute the various programs.

Although the embodiments of the present invention are explained thus far, other than the above embodiments, the present invention can be implemented in different embodiments within the technical scope of the claims.

All or some of the processes in the embodiments that are explained to be executed automatically can be executed manually, or all or some of the processes that are explained to be executed manually can be executed automatically with known methods.

The information including processing procedures, controlling procedures, specific names, and various data and parameters in the above document and drawings can arbitrarily be modified if not otherwise specified.

The components of the devices in the drawings are functional and conceptual, and the components are not necessarily to be physically configured as in the drawings. Specific configurations of distribution and integration of the devices are not limited to the configurations in the drawings, and all or some of the configurations can be configured by functionally or physically distributing and integrating in arbitrary units, in compliance with various loads and usage statuses.

All or arbitrary parts of processing functions conducted by the devices can be realized by a CPU (MCU, MPU) and programs analyzed and executed by the CPU (MCU, MPU), or can be realized as a hardware with a wired logic.

According to the present invention, performance degradation that occurs when a continuous vibration is erroneously detected as a fall can be prevented, and when the storage device is used for devices such as a computer or a home appliance, the devices can be used at ease without worry about vibrations, and a successful outcome such as increase in the utility value of the device can be accomplished.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device that retracts a head on a storage medium to a predetermined retraction position upon detecting a fall, the storage device comprising:

a falling-time measuring unit that acquires information indicating whether the magnetic disk drive is falling, from a fall sensor at a predetermined sampling cycle, and measures a falling time based on the acquired information;

a threshold changing unit that counts number of times the measured falling time exceeds a predetermined fall-determination threshold within a predetermined time, and extends the fall-determination threshold when the counted number of times exceeds a predetermined maximum number of times; and a head retracting unit that retracts the head to the retraction position when the measured falling time exceeds the extended fall-determination threshold.

2. The storage device according to claim 1, wherein when the counted number of times is below the maximum number of times, the threshold changing unit reduces the fall-determination threshold.

3. The storage device according to claim 1, further comprising:
a sampling-cycle changing unit that changes the sampling cycle based on the measured falling time.

4. The storage device according to claim 3, wherein when the measured falling time exceeds a predetermined sampling-cycle changing threshold, the sampling-cycle changing unit reduces the sampling cycle.

5. The storage device according to claim 4, wherein when the measured falling time is below a predetermined sampling-cycle changing threshold, the sampling-cycle changing unit extends the sampling cycle.

6. The storage device according to claim 3, wherein when the measured falling time exceeds a predetermined sampling-cycle changing threshold, the sampling-cycle changing unit advances the sampling cycle or delays the sampling cycle.

7. The storage device according to claim 3, wherein the sampling-cycle changing unit sets a plurality of sampling-cycle changing thresholds with different lengths in a stepwise manner, and sets a predetermined sampling cycle determined for each of sampling-cycle changing thresholds.

8. A continuous-vibration detecting method for a storage device that retracts a head on a storage medium to a predetermined retraction position upon detecting a fall, the continuous-vibration detecting method comprising:
falling-time measuring including
acquiring information indicating whether the magnetic disk drive is falling, from a fall sensor at a predetermined sampling cycle; and
measuring a falling time based on the acquired information;
threshold changing including
counting number of times the measured falling time exceeds a predetermined fall-determination threshold within a predetermined time; and
extending the fall-determination threshold when the counted number of times exceeds a predetermined maximum number of times; and
retracting the head to the retraction position when the measured falling time exceeds the extended fall-determination threshold.

9. The continuous-vibration detecting method according to claim 8, wherein
when the counted number of times is below the maximum number of times, the threshold changing includes reducing the fall-determination threshold.

10. The continuous-vibration detecting method according to claim 8, further comprising:
changing the sampling cycle based on the measured falling time.

11. The continuous-vibration detecting method according to claim 10, wherein
when the measured falling time exceeds a predetermined sampling-cycle changing threshold, the changing includes reducing the sampling cycle.

12. The continuous-vibration detecting method according to claim 11, wherein
when the measured falling time is below a predetermined sampling-cycle changing threshold, the changing includes extending the sampling cycle.

13. A computer program product comprising a computer usable medium having computer readable program codes embodied in the medium that when executed causes a computer to execute:
falling-time measuring including
acquiring information indicating whether the magnetic disk drive is falling, from a fall sensor at a predetermined sampling cycle; and
measuring a falling time based on the acquired information;
threshold changing including
counting number of times the measured falling time exceeds a predetermined fall-determination threshold within a predetermined time; and
extending the fall-determination threshold when the counted number of times exceeds a predetermined maximum number of times; and
retracting the head to the retraction position when the measured falling time exceeds the extended fall-determination threshold.

14. A control apparatus that controls a storage device that retracts a head on a storage medium to a predetermined retraction position upon detecting a fall, the control apparatus comprising:
a falling-time measuring unit that acquires information indicating whether the magnetic disk drive is falling, from a fall sensor at a predetermined sampling cycle, and measures a falling time based on the acquired information;
a threshold changing unit that counts number of times the measured falling time exceeds a predetermined fall-determination threshold within a predetermined time, and extends the fall-determination threshold when the counted number of times exceeds a predetermined maximum number of times; and
a head retracting unit that retracts the head to the retraction position when the measured falling time exceeds the extended fall-determination threshold.

15. The control apparatus according to claim 14, wherein
when the counted number of times is below the maximum number of times, the threshold changing unit reduces the fall-determination threshold.

16. The control apparatus according to claim 14, further comprising:
a sampling-cycle changing unit that changes the sampling cycle based on the measured falling time.

17. The control apparatus according to claim 16, wherein when the measured falling time exceeds a predetermined sampling-cycle changing threshold, the sampling-cycle changing unit reduces the sampling cycle.

18. The control apparatus according to claim 17, wherein when the measured falling time is below a predetermined sampling-cycle changing threshold, the sampling-cycle changing unit extends the sampling cycle.

19. The control apparatus according to claim 16, wherein when the measured falling time exceeds a predetermined sampling-cycle changing threshold, the sampling-cycle changing unit advances the sampling cycle or delays the sampling cycle.

20. The control apparatus according to claim 16, wherein the sampling-cycle changing unit sets a plurality of sampling-cycle changing thresholds with different lengths in a stepwise manner, and sets a predetermined sampling cycle determined for each of sampling-cycle changing thresholds.

* * * * *